United States Patent [19]

Timmer

[11] 4,255,269

[45] Mar. 10, 1981

[54] METHOD AND APPARATUS FOR ADAPTING THE COMPOSITION OF A DRILLING FLUID FOR USE IN MAKING A HOLE IN THE EARTH BY ROTARY DRILLING

[76] Inventor: Bernardus Timmer, Borgercompagnie 181, Netherlands

[21] Appl. No.: 43,229

[22] Filed: May 29, 1979

[51] Int. Cl.³ ............................................. E21B 21/06
[52] U.S. Cl. ................................ 252/8.5 R; 175/66; 175/206; 175/207; 210/400; 210/783
[58] Field of Search ............. 252/8.5 R; 175/66, 206, 175/207; 134/63, 104, 109; 15/302, 306 B; 210/77, 400, 406

[56] References Cited

U.S. PATENT DOCUMENTS

| | | | |
|---|---|---|---|
| 1,800,168 | 4/1931 | Brauer et al. | 252/8.5 X |
| 2,218,533 | 10/1940 | Huebotter | 175/66 |
| 2,873,032 | 2/1959 | Henry | 175/206 X |
| 3,039,545 | 6/1962 | Rogers | 252/8.5 X |
| 3,276,966 | 10/1966 | Talbot | 252/8.5 X |
| 3,693,733 | 9/1972 | Teague | 175/66 |

Primary Examiner—Herbert B. Guynn
Attorney, Agent, or Firm—Eugene E. Geoffrey, Jr.

[57] ABSTRACT

The drilling fluid of deviant composition is subjected to a separating process comprising two stages, including a sieving stage and thereafter a pressure filtration stage, the drilling fluid clinging to the sieve residue obtained in the sieving stage is sucked off by means of a partial-vacuum, the liquid obtained in the separating stage is used for adjusting the desired composition of the drilling fluid in the supply container thereof, and the solid material separated in the separating process is dried and further processed for recovering the solid material to be used in the drilling fluid.

6 Claims, 1 Drawing Figure

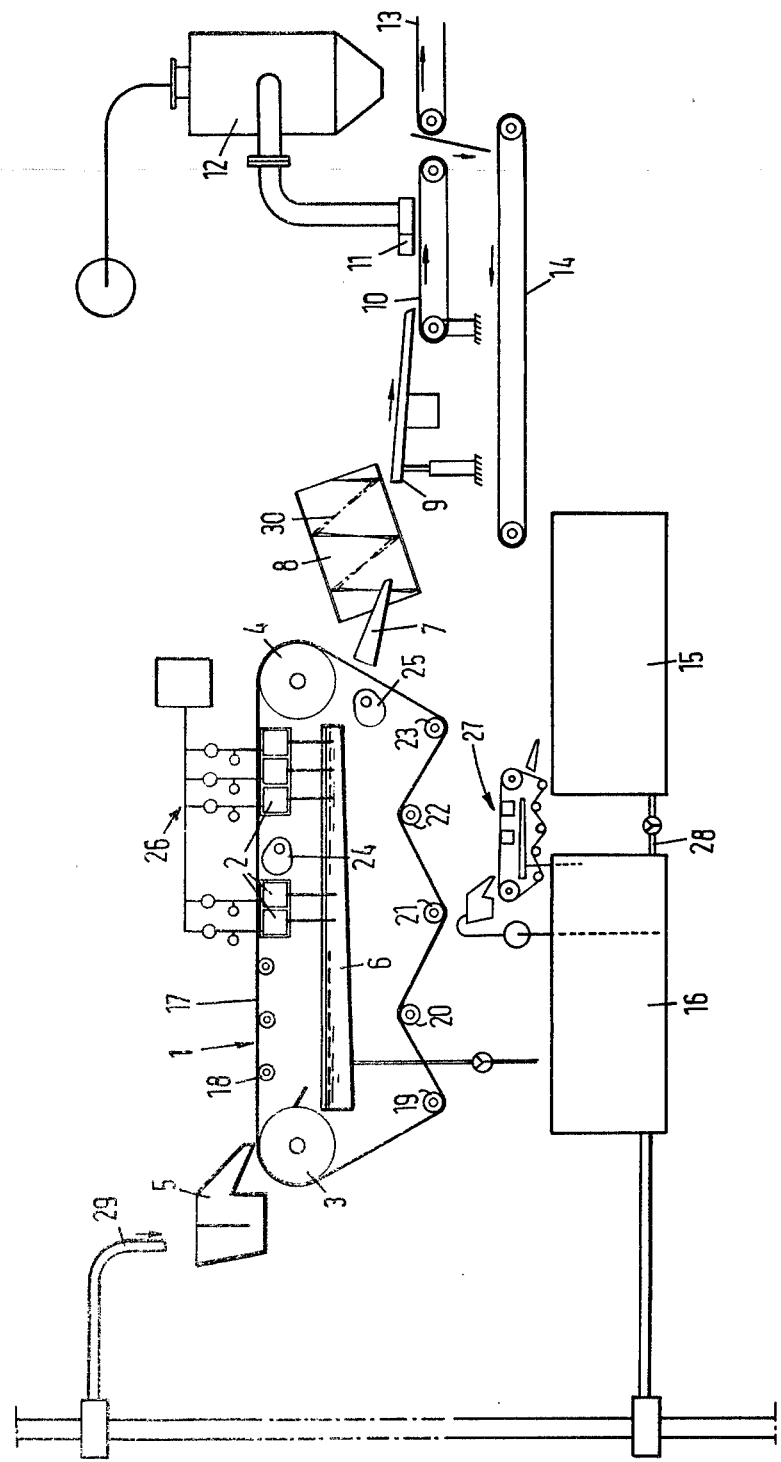

METHOD AND APPARATUS FOR ADAPTING THE COMPOSITION OF A DRILLING FLUID FOR USE IN MAKING A HOLE IN THE EARTH BY ROTARY DRILLING

This invention relates to a method of adapting the composition of a drilling fluid for use in making a hole in the earth by rotary drilling.

In making wells, such as in the winning of petroleum, using the system of rotary drilling, a drilling fluid is used. The drilling fluid is a suspension of a solid, for example baryte, in water and may contain various further additives. The drilling fluid has many functions, including transporting the drillings to the surface. The drilling fluid further has an effect on the drilling velocity, which partly depends on the specific gravity of the drilling fluid. This latter aspect requires in practice that the composition of the drilling fluid may be adapted to suit results experienced during drilling, in particular to be made of lower or higher specific gravity. Furthermore, of course, the composition of the drilling fluid should always be so adapted that the spent fluid effluent at the surface, which contains cuttings, should be subjected to a treatment during which the cuttings are separated and removed, and the remaining liquid material, after possible further adaptation of its composition, can be re-used.

For making the specific gravity of the drilling fluid lower, in practice conventionally the method is used in which a calculated amount of drilling fluid is allowed to drain away from the supply container, and subsequently such an amount of the basic material is added that the desired specific gravity is reached. This method is applied in particular during off-shore work. The material allowed to drain away naturally constitutes a loss and hence a cost item, apart from the fact that it is conducive to environmental pollution, in particular in the case of off-shore work.

For separating the drillings from the spent cuttings fluid, normally shaker screen devices are used, in which the sieve residue contains the cuttings which are carried off by means of special tanker vehicles in the case of the winning of petroleum or natural gas on land, or by means of specially adapted vessels in the case of off-shore work. In addition to the cuttings, the sieve residue will also contain a certain proportion of the solids suspended in the drilling fluid.

The filtrate of the shaker is the liquid material, which can be re-used for making drilling fluid.

When a shaker is used for processing the spent drilling fluid one should reckon with an average daily loss of drilling fluid, resulting from fluid clinging to the sieve residue, of 12–15 m$^3$. This loss of material naturally constitutes a disadvantage.

It is accordingly an object of the present invention to provide a method and apparatus for adaptation of the composition of the drilling fluid in such a manner as to keep the loss of material, and hence the risk of environmental pollution, as low as possible without detriment to the profitability of the drilling process.

According to one aspect of the present invention, there is provided a method of adapting the composition of a drilling fluid for use in making a hole in the earth by rotary drilling, characterized in that the drilling fluid of deviant composition is subjected to a separating process comprising two stages, including a sieving stage and thereafter a pressure filtration stage, the drilling fluid clinging to the sieve residue obtained in the sieving stage is sucked off by means of a partial-vacuum, the liquid obtained in the separating stage is used for adjusting the desired composition of the drilling fluid in the supply container thereof, and the solid material separated in the separating process is dried and further processed for recovering the solid material to be used in the drilling fluid.

Preferably the liquid material obtained in the separating process of the drilling fluid containing the drill cuttings discharged during the drilling of the hole in the earth is recycled to the fluid supply container, and the separated dried solid is stratified, using differences in specific gravity, in a layer comprising the drill cuttings and one or more other layers containing the additives of the drilling fluid, the drill cuttings containing layer is separated from the other layers and discharged, and the other layers are recycled to the drilling fluid supply container.

According to a different embodiment of the method according to the invention, in which the specific gravity of the drilling fluid is reduced by increasing the content of liquid, the preferred procedure is that the drilling fluid from the supply container is subjected to the separating process, and the resulting liquid is recycled to the drilling fluid supply container for a sufficiently long period of time to produce the specific gravity contemplated.

The invention also relates to an apparatus for carrying out the method according to the invention as described hereinbefore, and which is characterized by a separating zone comprising an endless sieve conveyor belt passed around return rollers, with the stage between a material supply end and a material discharge end of the sieve conveyor belt comprising a sieving stage and a suction stage, means for supplying the drilling fluid to be treated to the sieve conveyor belt, and one or more partial-vacuum vessels arranged below the sieve conveyor belt in said suction stage, which partial-vacuum vessels are connected to a subjacent receptacle for receiving drilling fluid, said receptacle being connected to the drilling fluid supply container, means for discharging the separated solids to a drying zone, comprising a drying furnace, means for discharging the dried solids to a solids-separating zone comprising a shaker for stratifying the solids, a suction means for sucking off the uppermost layer of solids, in particular to a specific gravity of at most 3.0, and means for discharging the other one or more layers from the solids-separating zone to the drilling fluid supply container or a solids supply container.

The invention will be described in greater detail with reference to the accompanying drawing.

The drawing shows diagrammatically a complete plant by means of which the drilling fluid from a bore hole and containing drill cuttings can be completely processed with recovery of the liquid phase and the solid phase, for example, baryte, and separation of the drill cuttings, while the plant is also suitable for changing the composition of the stocked drilling fluid, for example, to reduce its specific gravity.

Referring to the drawing, 1 designates a separator, comprising an endless sieve conveyor belt 17 passed around return and drive rollers 3, 4, and supported between these rollers 3, 4 by support rollers 18. The assembly of rollers 19, 20, 21, 22 and 23 enables belt 17 to be tensioned to a greater or lesser extent.

The zone between the return and drive rollers 3, 4 comprises a sieving stage approximately coinciding with the part of belt 17 supported by rollers 18, and a suction stage, approximately coinciding with the part of the belt against the bottom side of which partial-vacuum vessels 2 are provided. The reduced pressure in vessels 2 is produced by an assembly 26, comprising a source for pressure reduction, valves and manometers and conduits for interconnection thereof and for connection with partial-vacuum vessels 2.

By means of beater rollers 24 and 25, the innersurface of belt 17 can be beaten, which can influence the position of the material lying on the belt.

Disposed at the supply end of the belt is a supply container 5, through which the spent drilling fluid to be processed is supplied to the sieve conveyor belt. The applicator container 5 is fed with spent drilling fluid through supply conduit 29, which in a manner not shown is in communication with the outlet of the bore hole.

Disposed below conveyor belt 17 is a receptacle 6, in which the drilling fluid passed by the belt is collected.

Receptacle 6 is in turn in communication with the assembly of drilling fluid supply containers 15 and 16, which are interconnected by a conduit 28, which if desired may be closable. In connection with the reduced pressure in partial-vacuum vessels 2, a minimum spacing of preferably approximately 1 m is maintained between receptacle 6 and the partial-vacuum vessels.

The drilling fluid supplied to belt 17 through container 5 gradually loses its liquid with the chemical additives available therein, as viewed in the direction of transport of belt 17, assisted in particular by the suction under the influence of the reduced pressure maintained in the partial-vacuum containers, leaving as a sieve residue the solids contained in the spent drilling fluid, which as a merely moist material past return roller 4 falls off belt 17, and is passed further through discharge chute 7, and supplied to a rotary drying furnace 8. The latter is internally provided with helical guide means 30, by means of which the sieved granular material supplied is transported through the furnace.

The material issuing from furnace 8, which is a mixture comprising baryte and drill cuttings, falls on to shaker 9, and is transported further to a conveyor belt 10. Under the influence of the shaking movement, the dry solid material is stratified in the shaker, on account of the greatly varying differences in specific gravity of the drill cuttings (specific gravity approximately 2.6), on the one hand, and the baryte (specific gravity approximately 4.2), on the other. The superjacent layer, predominantly consisting of the drill cuttings, is subsequently sucked away through a suction nozzle 11, separated in cyclone apparatus 12, and finally discharged as a dry material through conveyor belt 13. The dry baryte remaining behind on conveyor belt 10 falls on to conveyor belt 14 and is recycled to supply containers 15, 16.

With the above-described embodiment of the apparatus and method according to the invention, a practically complete regeneration of the drilling fluid can be realized, and the waste material becoming available during the regeneration is the dry drill cuttings discharged from the plant by means of conveyor belt 13, which is indeed a waste material that is worthless for the drilling process.

A plant analogous to 1 is indicated by 27. If it is desired for the specific gravity to be reduced in connection with the drilling program, the drilling fluid can be pumped from containers 15, 16 and supplied to plant 27. The baryte, which increases the specific gravity of the drilling fluid, is then separated and kept available for re-use, whereas the liquid passed by sieving conveyor belt of plant 27, with the chemical additives available therein, is recycled to supply containers 15, 16. This process is allowed to continue until the desired specific gravity of the drilling fluid is reached, which result is thus achieved practically without any loss of material.

Naturally the apparatus described hereinbefore and shown in the accompanying drawing can be changed or modified without departing from the scope of the present invention.

I claim:

1. The method of adapting the composition of a drilling fluid, which includes additive solids, in a supply container for use in forming a hole in the earth by rotary drilling comprising the steps of subjecting a drilling fluid of deviant composition which includes drill cuttings and additive solids to a separating process which includes filtering said deviant fluid to remove solids therefrom and then subjecting the solid residue to a vacuum to remove fluid clinging to the solid residue, feeding fluid obtained by the separating process including the fluid removed by said vacuum to the drilling fluid in said supply container to adjust the specific gravity thereof, drying the solid residue containing said drill cuttings and additive solids and reclaiming said additive solids therefrom.

2. The method according to claim 1 wherein said dried solid material is vibrated to stratify into at least two layers one of which contains drill cuttings of one specific gravity and the other of which contains at least one additive solid of another specific gravity and then separating the additive solid from the drill cuttings whereby said additive solid is used in adjusting the specific gravity of the drilling fluid.

3. The method according to claim 1 which further includes adjusting the specific gravity of the fluid in said supply container by cycling said fluid to a second separating process which includes filtering the fluid to remove additive solids therefrom and subjecting the filtered additive solids to a vacuum to remove fluid clinging to the last said filtered solids, returning the filtered fluid to the supply container and continuing said second separating process until the desired specific gravity is attained.

4. Apparatus for adapting the composition of a drilling fluid in a supply container for use in forming a hole in the earth comprising an endless sieve conveyor belt carried by at least two rollers, means for feeding a deviant drilling fluid containing solid drill cuttings and at least one additive solid onto said conveyor belt, means beneath said belt for receiving fluid filtered by said belt, vacuum means disposed beneath a portion of said belt for removing fluid clinging to the solids filtered from said fluid, a conduit connecting said fluid receiving means to said supply container for feeding said filtered fluid to said container, a drying furnace, means for feeding said filtered solids to said furnace, a solids separating zone, means for feeding the solids dried by said furnace to said separating zone, said separating zone including vibrating means for stratifying solids with the upper stratified layer containing said drill cuttings and another lower layer containing said additive solid, vacuum means for removing said upper stratified layer and means for receiving said separated chemical solid.

5. Apparartus according to claim 4 wherein said filtered fluid receiving means is disposed approximately 1 meter below said vacuum means.

6. Apparatus according to claim 10 wherein the last said vacuum means removes solids having a specific gravity not exceeding 3.

* * * * *